United States Patent [19]

McSherry

[11] Patent Number: 5,536,121
[45] Date of Patent: Jul. 16, 1996

[54] ANCHOR INSERT

[75] Inventor: Thomas W. McSherry, Temple, Pa.

[73] Assignee: Titan Technologies, Inc., Temple, Pa.

[21] Appl. No.: 234,482

[22] Filed: Apr. 28, 1994

Related U.S. Application Data

[63] Continuation-in-part of Ser. No. 153,374, Nov. 16, 1993, which is a continuation-in-part of Ser. No. 965,735, Oct. 23, 1992, Pat. No. 5,308,203, which is a continuation-in-part of Ser. No. 949,425, Sep. 22, 1992, abandoned.

[51] Int. Cl.$^6$ .................................. F16B 25/00
[52] U.S. Cl. .............................. 411/31; 411/387
[58] Field of Search .................. 411/31, 387, 29, 411/178, 30, 386, 395, 184, 399, 424, 166, 187, 188

[56] References Cited

U.S. PATENT DOCUMENTS

| | | | |
|---|---|---|---|
| 126,366 | 4/1872 | Wills | 411/387 |
| 1,762,349 | 6/1930 | Phillips | 411/31 |
| 2,395,063 | 2/1946 | Paulus | 411/188 X |
| 3,202,035 | 8/1965 | Rosselet | 411/31 |
| 3,208,542 | 9/1965 | Fischer | 411/31 X |
| 3,467,209 | 9/1969 | Chromy | 411/31 X |
| 4,402,637 | 9/1983 | Seghezzi et al. | 411/31 |
| 4,601,625 | 7/1986 | Ermt et al. | 411/387 |
| 4,642,012 | 2/1987 | Blucher et al. | 411/395 X |
| 4,741,654 | 5/1988 | Lovisek | 411/188 X |
| 4,892,429 | 1/1990 | Giannuzzi | 411/387 X |
| 5,039,262 | 8/1991 | Giannuzzi | 411/30 |
| 5,160,225 | 11/1992 | Chern | 411/30 |
| 5,234,299 | 8/1993 | Giannuzzi | 411/31 |

FOREIGN PATENT DOCUMENTS

| | | | |
|---|---|---|---|
| 2642801 | 8/1990 | France | 411/178 |
| 1225529 | 9/1966 | Germany | 411/395 |
| 1475049 | 5/1969 | Germany | 411/387 |
| 2913482 | 10/1980 | Germany | 411/387 |
| 52-32455 | 3/1977 | Japan | 411/387 |
| 231155 | 6/1925 | United Kingdom | 411/387 |

*Primary Examiner*—Rodney M. Lindsey
*Attorney, Agent, or Firm*—Nolte, Nolte and Hunter

[57] ABSTRACT

An anchor, for inserting into a wall structure, having a cylindrical body, a flanged end, a cutting end and a through bore adapted to receive a support fastener. The outer surface of the body is threaded. The cutting end comprising a single cutter extending distally from the periphery of the through bore at the cutting end. Access of the cut material to the through bore as the cutting end of the anchor is inserted into the wall and rotated as provided by the entry end of the anchor, the periphery of which, extends in a spiral path.

9 Claims, 2 Drawing Sheets

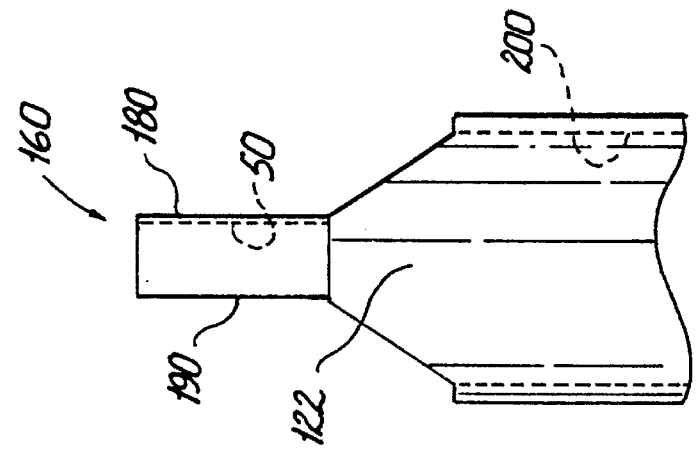
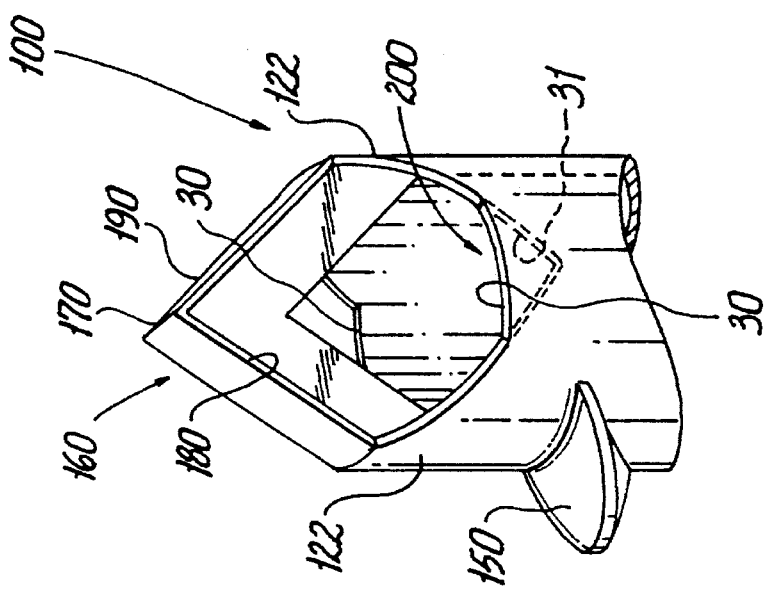

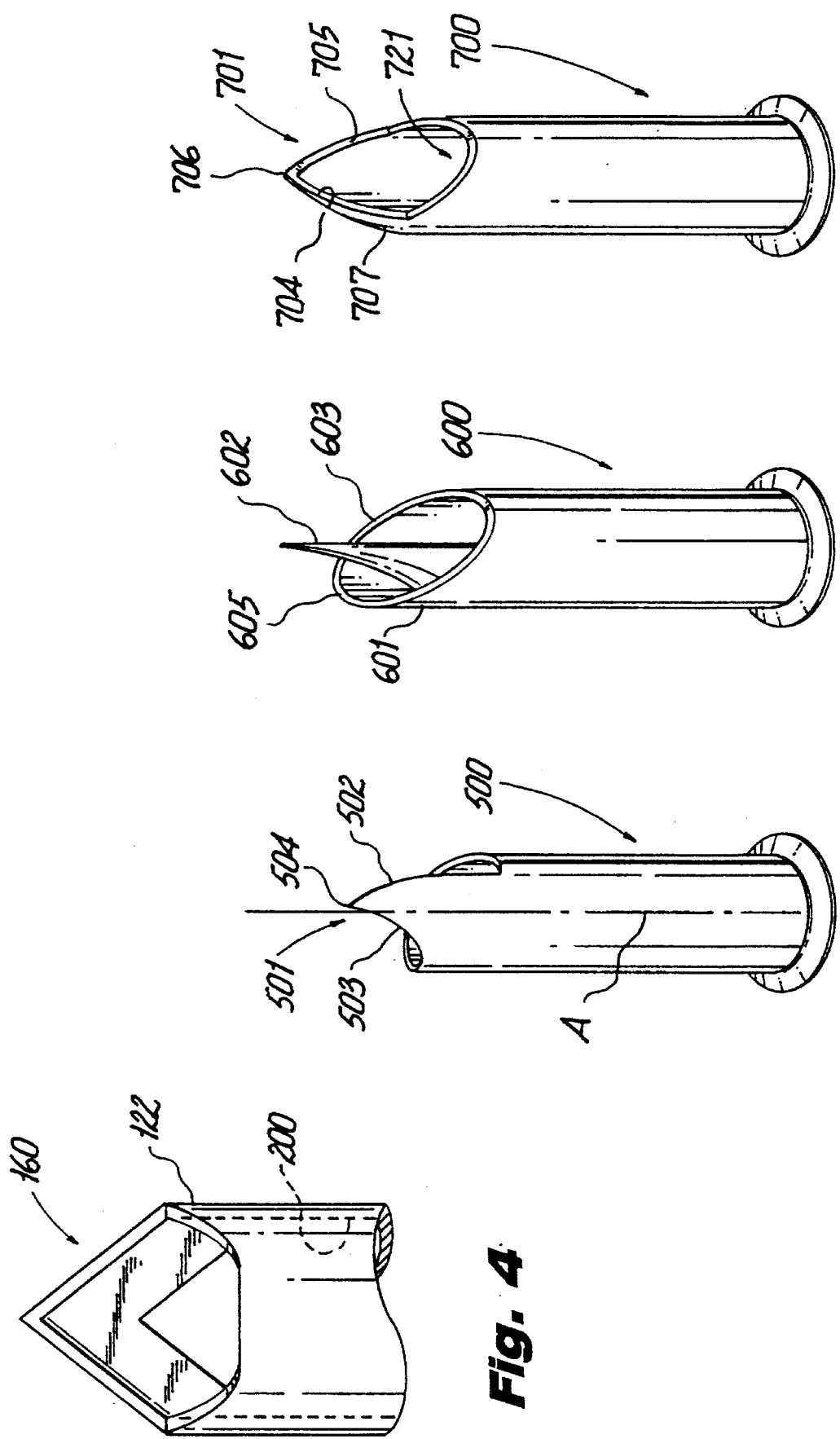

ANCHOR INSERT

This application is a continuation-in-part of application Ser. No. 08/153,374, filed Nov. 16, 1993 which is a continuation-in-part of application Ser. No. 07/965,735, filed Oct. 23, 1992 now U.S. Pat. No. 5,308,203, which is a continuation-in-part of application Ser. No. 07/949,425, filed Sep. 22, 1992 now abandoned.

BACKGROUND OF THE INVENTION

This invention relates to wall anchors for securing a support fastener and particularly to a cylindrical wall anchor with an outer thread for tapping into wall material such as dry wall, sheet rock and wood comprising the surface material of a hollow "wall" or similar structure. It especially relates to the construction of such a wall anchor having a central bore to pass the material of the wall which has been dislodged by the action of the distal end of the anchor. The distal or cutting end is constructed to provide a circular cut in the wall in advance of the outer threads as the distal end of the anchor is press-turned into the wall.

Prior art anchors, best typified by the self-drilling inserts disclosed in U.S. Pat. Nos. 4,601,625; 5,039,262; and 5,160,225; provide closed end drill tips which are not desirable because of the heat of friction generated between the drill and the wall material and because the wall material is pushed and compressed during the drilling process resulting in breakage of the wall material around the bore at the rear surface of the wall and thus in a weakening of the wall's capacity to retain the anchor under stress. When used to penetrate wood panelling, the wood tends to split.

U.S. Pat. No. 5,234,299 to Gianuzzi discloses an open end drill tip with a pair of saw teeth in a saw-toothed configuration which, for the most part, eliminates generating heat by the typical drill tip. However, that anchor retains the concept of drilling by providing a tapered cylindrical surface to maintain the circularity of the drilled hole, by outward radial compression against the bank of the hole, before it is tapped by the thread on the shank portion of the anchor. Also, the saw-toothed configuration has the leading; i.e., cutting edge of each revolving tooth of the drill cutting material from the tip of each saw tooth to the pointed valley where it meets the trailing edge of the next saw tooth. This results in material build-up between the teeth and surface of the hole as it is being drilled because some of the cut material is squeezed into the pointed valley which is a circumferentially limited access area to the central bore.

In my co-pending application, Ser. No. 07/965,735, filed Oct. 23, 1992, soon to be issued as U.S. Pat. No. 5,308,203, incorporated herein by reference, there is also disclosed a threaded cylindrical anchor with a through bore and saw teeth at the distal end in the form of peaks with flat valleys therebetween to provide easier access areas for the cut wall material to pass to the open end of the anchor. The threads extend along the cylindrical body of the anchor to immediately start tapping the circular cut in the wall to eliminate drilling.

In my co-pending application, Ser. No. 08/153,374, filed Nov. 10, 1993, incorporated herein by reference, there is also disclosed through bore anchors with circular saw tips of varying configuration in which access areas are provided between the tips of the multiple teeth, the cutting edges of which are outside of the diameter of the distal end of the anchor to avoid the provision of guiding surfaces about the distal end and thus avoid drilling a hole prior to tapping. In this respect, the threads on the anchor body extend between the proximal and distal ends so that tapping can commence as the circular cut is formed and before the hole is drilled. Application Ser. No. 08/153,374 also discloses a single saw tooth at the tip of the distal end of the anchor which provides the greatest amount of access area for the wall material being dislodged to the through bore.

It is an object of this invention to provide an outwardly threaded insert which has a cylindrical body with an axial through bore, a flange at its proximal end and, in one preferred embodiment of the invention, having an improved single cutter extending from the periphery of the open distal end of the anchor for first piercing the wall prior to rotation of the anchor to cut a hole in the wall and to permit the wall material around which the tip has cut to enter the axial bore so as not to be pushed and compressed and to "explode" out of the rear surface of the wall or otherwise weaken the seat of the anchor when in place.

It is another object of this invention to provide a hollow, flanged and threaded cylindrical anchor with a single drill tip disposed at the otherwise open distal end across the axis of the anchor extending between distally extended drill mounts to provide access areas on either side and under the proximal edges of the drill tip so that the drilled material will not be pushed and compressed against the wall material as the hole is being formed. The drill tip is formed to cut, or slice, into the wall material before rotation so that the drill mounts act as collectors of the material to deposit the material into the hollow of the cylindrical anchor.

In both embodiments, it is preferred to extend the thread of the anchor to the distal end so that tapping may proceed as the hole is formed. In this respect, the single drill tip of the second embodiment acts more like a cutter, although it granulates the wall material because the tapping of the hole while it is being formed prevents drilling in the sense that a hole is drilled before it is tapped.

In the embodiments of this invention, it is contemplated to provide a certain amount of outward radial compression between the anchor and wall material as the turning anchor taps the wall material and in this respect, a flat band-shaped compressor or what may be called a wedge strip is provided between the turns of the spiral thread of the anchor. In this construction, the compression between the anchor and wall between the turns of the spiral of the thread adjacent the flanged proximal end of the anchor tightens the seat of the anchor as by wedging.

As noted in co-pending application Ser. No. 08/153,374, it has been found that a saw tipped anchor having a single saw tooth saws the hole for the anchor seat more efficiently than anchors with plural saw teeth in any configuration. It is believed that this is so because the configuration of the end of the through bore at the saw toothed end is slanted across the anchor axis so that there is more area for the cut wall material to enter.

The slanted configuration of the end of the anchor adjacent the improved single cutter of this invention is maintained in the configurations of the present invention. The configuration of the cutter, however, has been designed to provide a pointed knife tip and, in the first embodiment, a leading cutting edge more or less parallel to the anchor axis, with the periphery of the anchor end extending from the trailing edge of the cutter to the proximal end of the leading edge in a spiral path. Thus, having the access area about the periphery of the bore at the cutting end of the anchor shaped to collect the wall material as it is cut.

In the second embodiment of the invention, the drill tip is, in fact, a knife disposed across the otherwise open end of the anchor and the drill mounts diverge in a curved; i.e., spiral path proximally along the periphery of the distal end of the anchor to act as collectors of the drilled material as the anchor is rotated.

It is contemplated by this invention that the flanged end of the insert is provided with a recess for receiving a drive tool, such as a screw driver, for rotating the entry end against and through the wall board and that the interior of the axial bore of the insert is splined along its proximal extension so that a screw fastener may tap the splines as it is screwed into the insert. It is also contemplated by this invention that the distal extension which has captured the material passed the knife of the entry end, extends passed the rear surface of the wall board. Resultingly, the screw fastener, which may be longer than the width of the wall board, after tapping into the splines of the axial bore may then thread into the captured material or act to push the material out of the entry end of the anchor.

In a preferred embodiment of the invention, the outer diameter of the proximal extension of the anchor increases from its juncture with the distal extension to its flanged end, while the distal extension of the insert comprises a straight cylinder with a slightly smaller outside diameter than the increasing outside diameter of the flanged proximal extension.

The cylindrical body may be outwardly threaded substantially along its entire length with the height of the thread increasing from the entry end; i.e., distal end, to the flanged end inasmuch as the cutting action of the cutter and drill as they are inserted in the wall facilitates a quick insertion and immediate threading by the entry of the threads into the wall material. The increase in the height of the thread from distal end to proximal end together with the increase in diameter of the proximal extension results in a gradual increase in the size of the tapping in the wall material to more gently push the wall material radially about the increasing height of the thread around the insert, thus, again avoiding "exploding" the wall material about the insert during insertion while providing a strong grip between the wall material and insert when in place.

It has also been found that the disposition of the thread around the body of the insert close to the entry end results in a pulling action on the insert just as the single cutter or drill enters the wall and thus a facile installation.

The inventive anchors as disclosed are designed for insertion into wall board and more resistant materials such as wood and may be molded of strong plastic materials such as nylon or a mixture of nylon and KEVLAR (a trademark of DuPont) combined but which may also be made of less strong plastics inasmuch as the friction normally resulting because of drilling operations of prior art inserts, is diminished because of the cutting ends of the inserts of the invention. These inserts may also be cast in zinc.

BRIEF DESCRIPTION OF THE DRAWINGS

FIG. 1 is a diagrammatic perspective view of a first embodiment of the invention in which a single cutter extends from the periphery around the open entry end of the anchor;

FIG. 2 is a diagrammatic perspective view of the distal end of a second embodiment of the invention in which a single drill extends centrally across the axis of the anchor, mounted by extensions from the otherwise open entry end of the anchor;

FIG. 3 is a diagrammatic side elevational view of the distal end of the anchor of FIG. 2 with the outer thread of the anchor omitted;

FIG. 4 is a diagrammatic frontal view of the distal end of the anchor of FIGS. 2 and 3 with the outer thread omitted;

FIG. 5 is a diagrammatic perspective view of the cylindrical body of an anchor of the invention in which the flange and the thread have been omitted and the cutting edge of the cutter is curved;

FIG. 6 is a diagrammatic perspective view of the flanged cylindrical body of an anchor of the invention in which the thread has been omitted and with a centering finger extending from the inner surface of the anchor along the axis of the anchor; and FIG. 7 is a diagrammatic perspective view of the flanged cylindrical body of an anchor of the invention in which the thread has been omitted and the centering element of the distal end is the tip of the cutting tooth brought to the anchor's axis.

Referring first to the embodiment of FIG. 1, the insert 10 comprises a cylindrical body 11 having a flange 14 at its proximal end 12 and a cutter 16 at its distal end 13. The insert is outwardly threaded as at 15 substantially along its length from the flange 14 to the cutter 16 at the distal end with the height of the thread diminishing near the cutter 16. Starting the thread close to the cutter in this embodiment has the effect when the insert is rotated of pulling the insert through the wall just as soon as the cutter has cut into the wall.

Internally, as disclosed in the aforementioned pending applications, the insert is formed with an axial bore 20 (indicated by dotted lines) splined as at 21 along the proximal section with a phillips screw head recess 19 extending inwardly from the proximal opening of the bore at the flanged end for rotationally driving the insert with a power driven screw driver.

The cutter 16 is molded integrally with and extends distally from the cutting end of the anchor from the periphery of the distal end surrounding the distal end of the bore. It is pointed as at 17 so that it may be inserted in a wall like the tip of a knife. Its leading edge 18 extends proximally more or less parallel to the axis of the anchor from its tip 17 to the periphery of the distal end opening where it is met by the sloped periphery 22 of the distal end opening extending proximally in a downward spiral path from the trailing edge 23 of the tip 17 to the point of joinder with the leading edge of the cutter. The sloped periphery provides access to and guidance of the cut material of the wall as the anchor is rotated after the tip of the cutter is inserted into the wall.

Upon insertion and rotation, the thread 15 begins to tap the surrounding cut in the wall.

Note that the high thread 15 at the proximal end of the anchor insert, together with the shaped distal side of the flange when embedded in the wall will act to compress the wall material in that area and thus resist further forward movement of the insert when the screw is tapping the splines.

The embodiment of the invention shown in FIGS. 2–4 comprises an insert 100, threaded as at 150, and having a flange (not shown) at the proximal end and a drill tip 160 at the distal end of the anchor. The drill tip is in as shown in FIGS. 2–4, the shape of a chevron with its pointed end extending distally at the axis of the anchor. Its arms including the leading edges 180 and trailing edges 190 diverge from the tip 170 and extend radially to either side to partially close the otherwise open end of the through bore 200.

The distal ends of the drill tip may be extended radially as suggested in the dotted lines 50 in FIG. 3 to form sharp leading edges although the edges of the leading ends act as such acceptably.

The arms of the chevron-shaped drill tip are secured at their ends to drill tip mounts 122 which extend distally at the end of the anchor to space the inverted V-shaped bottom over the distal end of the through bore which partially closes the end of the bore, provides access areas on either side of the drill tip and between the drill and distal end of the anchor to receive the pulverized wall material as a hole in the wall is being drilled.

The mounts 122 are formed to diverge proximally from the drill tip ends to the distal end of the through bore so that their leading edges act as collectors of the drilled material while providing access for the material into the through bore.

Inasmuch as the leading edges of the mounts are formed with the end of the cylindrical anchor, they extend along spiral paths from the drill tip ends to the distal end of the anchor through bore.

In use, the drill tip of the anchor is inserted into the wall so that it functions as a knife tip to cut into the wall before it is rotated at which time the leading edges of the drill tip function as drill cutters pulverizing the wall material as it is advanced and rotated through the wall.

FIG. 5 illustrates a cylindrical anchor 500 in which the cutting or distal end comprises a cutter 501, the leading edge 502 of which diverges from the trailing edge 503 and is curved proximally from the tip 504 to extend in planes substantially parallel with the axis A of the anchor.

FIG. 6 illustrates an anchor 600 with a single cutter or tooth 601 as disclosed in co-pending application No. 08/153,374 with its leading edge 603 and trailing edge (not shown) diverge from the tip 605 and with a centering finger 602 extending from the inner surface of the bore to the axis of the anchor where it extends to a pointed tip proximally above the tip of the cutter. The provision of a centering finger is optional in the single cutter construction.

FIG. 7 illustrates an anchor 700 in which the single cutter is optionally formed as a cowl with the tip brought to the anchor's axis to form a centering tip to partially close the distal end of the bore 721. As shown in FIG. 7, the leading edge 704 and trailing edge 705 diverge proximally and radially from the tip 706 and in substantially spiral paths around the distal end of the anchor to provide access for cut material to the passage 721.

In all of the embodiments, except the drill tip of FIGS. 2–4, the periphery of the distal end of the anchor extending from the cutter provides access areas for the cut material and guiding surfaces to guide the cut material into the bore.

In the anchor of FIGS. 2–4, the drill pulverizes as it cuts the material and the edges of the mounts do act as collectors. However, this access between the mounts under the drill tip need not provide the flat edges 30 as shown.

Those edges may be extended from the mounts proximally to pointed openings 31, shown in dotted lines in FIG. 2, which can receive the pulverized material quite well.

In all events, it has been found sufficient to have the edges of the bore periphery in all of the embodiments to follow a curved path from the cutter, proximally around the periphery of the bore.

The inventions in the anchors disclosed may be modified without departing from the spirit and scope of the invention defined by the following claims.

I claim:

1. An anchor for insertion in wall material, said anchor comprising a cylindrical body extending along a center axis and having an outer thread extending substantially along the length of said cylindrical body, a radially extending flange at a proximal end, a bore extending along said center axis from said proximal end of said body to a cutter tipped distal end of said body, means at said proximal end for receiving a tool for rotating said anchor about said center axis, said bore including means extending axially along said bore from said proximal end for receiving and for being tapped by the threads of a fastener, a single cutter integral with and extending distally from said distal end of said body adjacent said bore at said distal end of said body, said single cutter being defined by a leading edge and a trailing edge, said edges diverging toward said proximal end from an insertion tip to constitute means for penetrating the wall and for cutting said wall board material as said anchor is rotated and forming access means to said bore for receiving material cut from the wall as said body is rotated after said tip is inserted in the wall, said outer thread extending from said proximal end adjacent said flange to said distal end adjacent said single cutter and constituting means for tapping the wall board material and for pulling said anchor through the wall board material as said single cutter is rotated without drilling a hole in the wall board in advance of said thread, said outer thread having a high turn adjacent said flange at said proximal end, said high turn and said flange comprising means, when embedded in the wall material because of rotation of said wall anchor, for compressing wall material for resisting further distal movement of said anchor when a screw fastener is tapping said means for receiving and for being tapped by the threads of a fastener.

2. The anchor of claim 1 wherein said leading edge of said cutter extends in a plane substantially parallel with said center axis and said trailing edge extends around the periphery of said distal cutting end proximally in a spiral path to said bore at said distal end of said body.

3. The anchor of claim 2 wherein said leading edge extends in a curved path from said insertion tip to extend in a plane substantially parallel with said axis of said body.

4. The anchor of claim 1 wherein said insertion tip is disposed at said center axis of said cylindrical body forming a centering tip and partially closing said bore.

5. The anchor of claim 4 wherein said leading and trailing edges diverge radially and toward said proximal end from said insertion tip disposed at said axis of said cylindrical body.

6. The anchor of claim 5 wherein said leading and trailing edges extend toward said proximal end in spiral paths to adjacent said bore at said distal end of said body.

7. The wall anchor of claim 4 wherein said thread diminishes in height from said proximal end to said distal end adjacent said single cutter.

8. The anchor of claim 1 wherein a centering finger extends from an inner surface of said bore along said center axis of said body.

9. The wall anchor of claim 1 wherein said thread diminishes in height from said proximal end to said distal end adjacent said single cutter.

* * * * *